Figure 1:
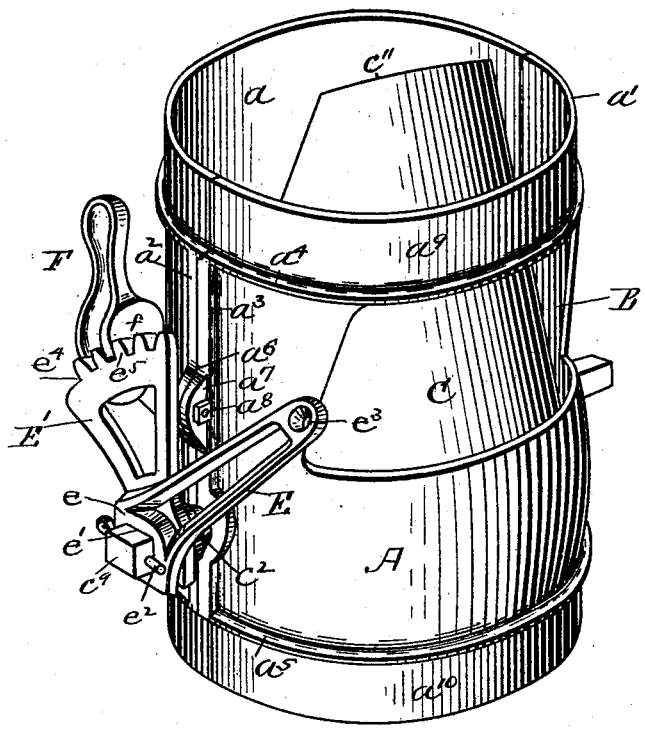

No. 637,271. Patented Nov. 21, 1899.
F. A. MAGEE.
DAMPER FOR FURNACES, STOVES, &c.
(Application filed Dec. 30, 1897.)
(No Model.) 3 Sheets—Sheet 1.

WITNESSES
J. M. Dolon.
Leo. A. Walsh.

INVENTOR
Frank A. Magee
by his attys
Clarke & Raymond

No. 637,271. Patented Nov. 21, 1899.
F. A. MAGEE.
DAMPER FOR FURNACES, STOVES, &c.
(Application filed Dec. 30, 1897.)
(No Model.) 3 Sheets—Sheet 2.

WITNESSES
J. H. Dolan
Leo. A. Walsh

INVENTOR
Frank A. Magee
by his attys
Clark & Raymond

No. 637,271. Patented Nov. 21, 1899.
F. A. MAGEE.
DAMPER FOR FURNACES, STOVES, &c.
(Application filed Dec. 30, 1897.)
(No Model.) 3 Sheets—Sheet 3.

WITNESSES
J. W. Dolon.
Leo A. Walsh.

INVENTOR
Frank A. Magee
by his atty
Herbert Raymond

UNITED STATES PATENT OFFICE.

FRANK A. MAGEE, OF WENHAM, MASSACHUSETTS, ASSIGNOR TO THE MAGEE FURNACE COMPANY, OF BOSTON, MASSACHUSETTS.

DAMPER FOR FURNACES, STOVES, &c.

SPECIFICATION forming part of Letters Patent No. 637,271, dated November 21, 1899.

Application filed December 30, 1897. Serial No. 664,678. (No model.)

*To all whom it may concern:*

Be it known that I, FRANK A. MAGEE, a citizen of the United States, residing at Wenham, in the county of Essex and State of Massachusetts, have invented a new and useful Improvement in Dampers for Furnaces, Stoves, and other Heating Apparatus, of which the following is a full, clear, and exact description, reference being had to the accompanying drawings, forming a part of this specification, in explaining its nature.

The invention relates to a damper having a casing which forms a part of the smoke-escape pipe, flue, or conduit and which has in its side an opening for the admission of outside air to said flue, and which also has a damper plate or valve contained within the casing, adapted when shut against the inner surface of the casing to close said inlet and when wide open to almost close the passage in said case, and which damper plate or valve and casing are so constructed that contact between one edge of the valve or plate and the inner wall of the case upon the side of the opening toward the stove or furnace or in the direction from which the waste of combustion comes shall be maintained whatever relation the remainder of the plate or valve may bear to the inlet or to the passage in the case, the object of this construction being to prevent the escape of gas, smoke, or heated air from the pipe through the inlet while the damper plate or valve is being opened or while it is open and regardless of the position to which it may be opened.

The invention further relates to means in a damper of the character specified whereby it may be opened or closed to any desired extent and locked or held in any desired position; also, to means in this kind of damper whereby it may be so operated whether it is in a vertical or horizontal position; also, to a construction whereby this kind of damper may be operated from the left or from the right side of the inlet and by the same operating devices, which are adapted to be transferred from one side of the damper to the other, the damper-casing being constructed to permit of this interchange in position of the operating parts.

Figure 2:
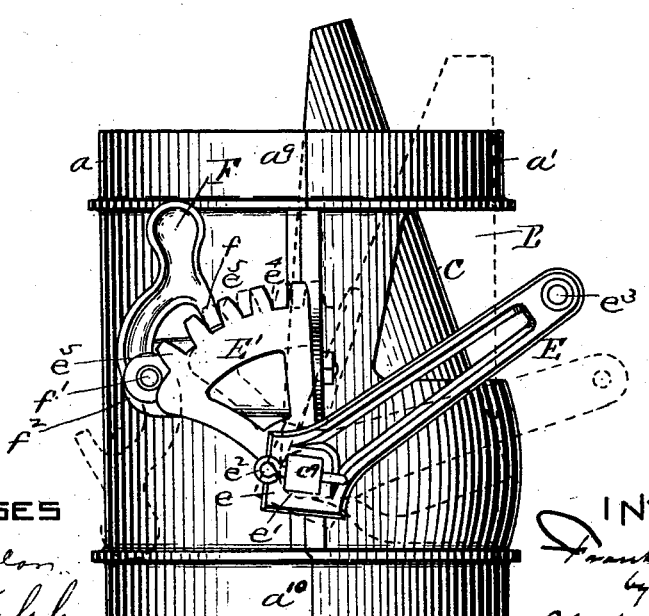
Figure 3:
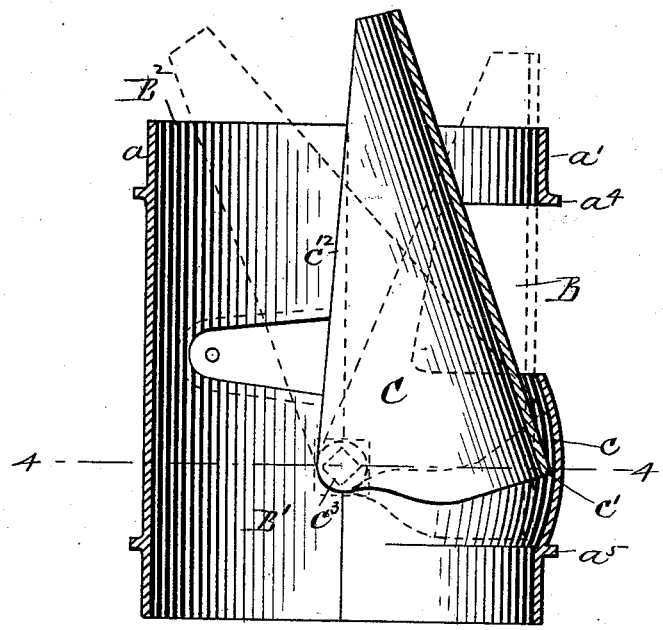
Figure 4:
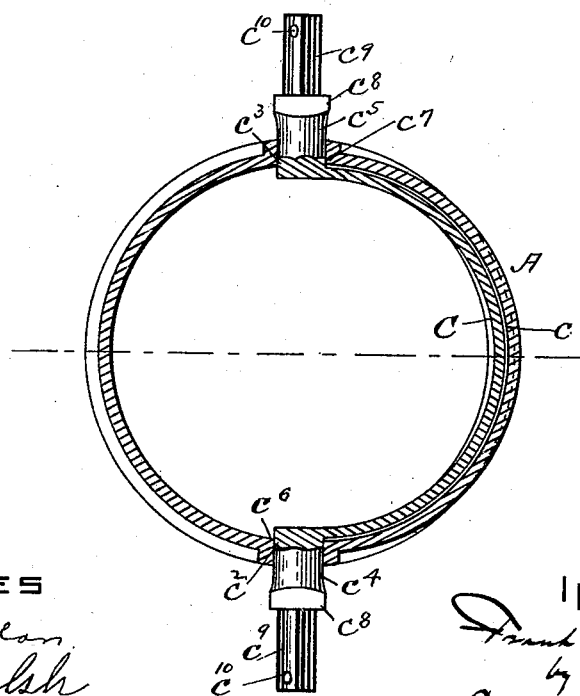
Figure 5:
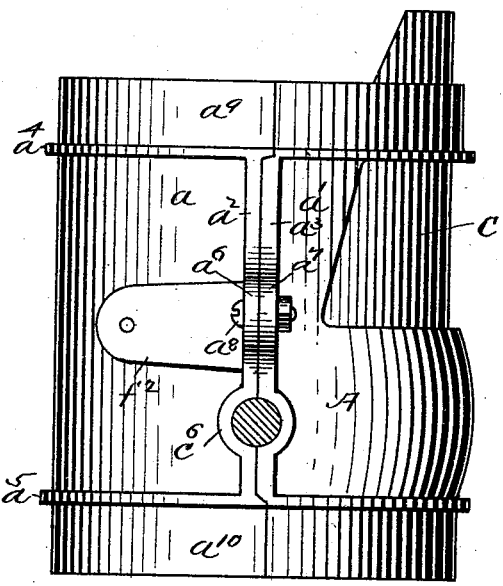
Figure 6:
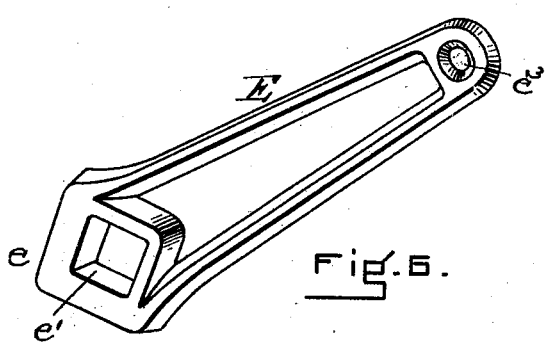
Figure 8:
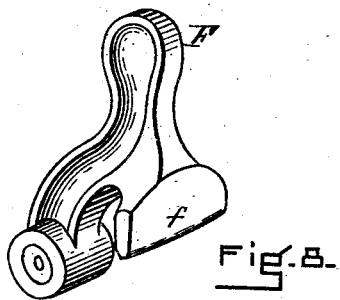
Figure 7:
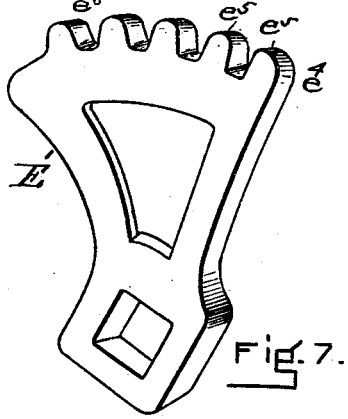

In the drawings, Figure 1 represents a view in perspective of the damper, the damper plate or valve being shown as partly open, thereby partially throttling the passage in the casing and opening the cold-air inlet. Fig. 2 is a view in elevation of the damper, showing the damper plate or valve and its operating-valve as in the position represented in Fig. 1, and also showing in dotted outline the position of these parts when the damper plate or valve is shut to fully close the cold-air inlet and to fully open the passage in the damper casing or flue. Fig. 3 is a view of the damper in vertical central section, representing by full lines the damper plate or valve in the position in which it is shown in Figs. 1 and 2 and by dotted lines in its fully-closed and fully-opened positions. Fig. 4 is a view in horizontal section upon the dotted line 4 4 of Fig. 3. Fig. 5 is a view in side elevation of the damper-casing, showing the damper-operating devices removed and the lug for supporting a locking-lever, hereinafter referred to. Fig. 6 is a view of a removable operating-lever. Fig. 7 is a view in perspective of a removable locking-segment. Fig. 8 is a view in perspective of a removable locking-pawl.

The damper-casing A may be formed in any desired way. It may be integral with the smoke or escape pipe or it may form an independent section thereof. Such is the construction represented in Fig. 1, where the casing is of cast-iron and in two longitudinal parts $a$ $a'$, having longitudinal flanges $a^2$ $a^3$, respectively, between the beads $a^4$ $a^5$, which are enlarged at $a^6$ $a^7$ to form ears, through which fastening-bolts $a^8$ may pass. The construction of one side of the damper-case only is shown in the figures. The damper-case also has the pipe-flange $a^9$ above or beyond the bead $a^4$, and the pipe-flange $a^{10}$ below or beyond the bead $a^5$. These flanges provide means whereby the damper-casing is conveniently coupled to sheet-metal or other pipe sections.

The section $a'$ of the case has the opening forming the cold-air inlet B and providing means whereby air from outside the casing may be admitted to its passage B'. Its inner surface $c$ is also shaped horizontally and vertically to the shape of the outer surface of the damper plate or valve C, which is against it, and to the curved path or line of movement which the lower edge $c'$ of the damper plate or valve takes as it is turned from its closed position to its wide-open position. This shape of the inner surface $c$ of the casing and the relation which the lower edge $c'$ of the damper plate or valve bears to it as it is moved and in its various positions is best represented in Fig. 3, where three positions of the damper plate or valve are shown, in each of which the lower edge $c'$ is represented as in contact or substantially in contact with the curved inner surface $c$. There is thus insured a substantially or relatively tight joint between the damper and the casing upon the side of the casing having the inlet and upon the side of the inlet toward the furnace or stove, whereby gas, smoke, ashes, heat, &c., are prevented from entering the room in which the damper is through the inlet and at all other times and without regard to the position of the damper. This is a very desirable improvement, because in other dampers of this class there has been no provision for obtaining and maintaining a tight joint at the outer edge of the damper plate or valve at all times, and considerable annoyance has arisen from the escape of noxious gases, dust, &c., from the damper-casing through the inlet, especially when the damper plate or valve was wide or very nearly wide open and the flue-passage in the damper-case reduced to its smallest or substantially its smallest size. Moreover, the present construction is an improvement in that the operation of the damper is more sure and certain, especially when the damper is wide open, as the light draft from the furnace or stove then existing is not interrupted or divided by the channel between the base of the damper and the casing, which opening exists in all other types of this damper, and this improvement in the operation of the damper is an especially important result arising from the invention.

The damper plate or valve C bears some resemblance in form to half a hollow frustum of a cone, especially in the form which I prefer to use. It has a conical surface which gradually widens from its upper to its lower end and which is of the curve horizontally or from side to side of the main part of the inner surface of the casing. It is preferably pivoted to the casing at $c^2$ $c^3$ by trunnions $c^4$ $c^5$, respectively, cast integral with the damper plate or valve and extending outwardly in line with each other from its lower corners. This construction does away with the extension of the spindle across the casing-passage. The trunnions are supported by bearings $c^6$ $c^7$ in the damper-casing, which are arranged to be equally formed in the two sections $a$ $a'$ upon their meeting lines. The trunnions where they bear are circular in shape. Outside the casing each trunnion has a shoulder $c^8$, from which extends a spindle $c^9$, square in cross-section, (see Fig. 4,) and in the end of each of which is a pin-hole $c^{10}$. These spindles are adapted to receive and hold the same latching-lever and arm E. In Fig. 1 this operating-arm is represented upon the left spindle of the damper plate or valve facing the inlet C. It has the enlarged end $e$, provided with a square hole $e'$ of a size to fit either of the squared spindles $c^9$, which are of the same size and length, and it is adapted to be locked to either spindle by a removable locking-pin $e^2$, which passes through the hole $c^{10}$. The arm or lever may have at its outer end a hole $e^3$, by means of which connection with the cord or chain of an automatic damper-regulating device may be made. The spindle has also a removable segment extension E', which may or may not be integral with the arm and which has at its outer edge a curved line of latching-notches $e^4$, formed by the teeth $e^5$. These notches are adapted to receive a locking detent or pawl $f$, extending from the under side of the lever F, which is detachably secured by means of a removable screw or pivot $f'$ to the face or lug $f^2$ of the section $a$ of the damper-casing. This locking-lever is adapted to be used on either side of the damper-case and to be transferred from one side to the other, according as it is desired that the damper shall be operated from the right or left hand, and the damper-casing therefore has two faces or lugs $f^2$. The locking-lever has a movement upon its pivot toward and from the notches, and it serves with the locking-notches to lock the damper plate or valve in its closed or wide-open position or at intermediate points. In Fig. 1 it is represented as locking the damper plate or valve in a half-closed position. The segment when separate from the arm E has a square hole which fits either spindle.

The construction of the locking device is such that it operates equally well in locking the damper plate or valve whether the casing be in a vertical position, as represented in Fig. 1, or whether it be in a horizontal position or in any inclined position between the two. This is due to the peculiar form of the locking-lever and to the arrangement of its pivotal point in respect to the locking-segment, whereby it is adapted by gravity alone to make engagement with the teeth of the segment and to maintain that engagement whether in a perpendicular position, which brings the pivotal point at one side of the segment, or whether in a horizontal position, when the pivotal point would be above the segment and the locking-tooth at one side thereof, as will be seen by viewing Fig. 2, turned a quarter.

The operation of the invention and its advantages have been given in connection with the description, and I will only add that by the movement of the lever E or any other equivalent operating device the damper plate or valve is opened or closed and to any desired extent and that the locking-pawl serves to lock it in the position to which it may be moved by the lever. In Fig. 3 it is shown by dotted outline fully open. There is then provided a very restricted passage $B^2$ between the wall of the case and the pipe beyond it and the curved upper edge $c^{11}$ of the damper plate or valve, the remainder of the passage $B'$ being closed by the contact of the lower edge $c'$ and side edges $c^{12}$ of the damper plate or valve with the casing.

The damper plate or valve when shut comes in contact with the inner surface of the casing above and below the inlet and upon each side thereof and tightly closes the same.

I do not confine myself to the specific shapes and operating devices herein specified, and desire it understood that the invention includes all mechanical equivalents therefor.

The locking pawl or tooth of the lever F is wide, extending from each side of the lever. By making this tooth or pawl wide the lever is adapted to be interchanged in position from one side to the other and still be held by its holding screw or stud closely to the face of the lug and so that the sector may be moved by or past its pivoted end, the pawl or tooth being wide enough to project into the path of movement of the notches, and when upon one side one end of the tooth is operative and when the lever is transferred to the other side of the case the other end of the tooth becomes operative. It will also be seen that the locking-lever may be thrown back to entirely disengage the pawl or tooth from the notches of the segment and to a position in which it will remain by gravity inoperative until returned to engaging position.

The latching device preferably is so constructed as to permit the damper to be opened by its operating lever or arm without raising by hand the latch, the movement of a tooth against the latch serving to lift the latch sufficiently to enable it to ride over it and drop upon the other side by gravity, while, on the other hand, the damper plate or valve cannot be closed without disengaging the latch by hand, the latch thus serving to hold positively the damper in the position into which it may have been moved while it permits the damper to be moved to such position. When the damper is automatically actuated by a regulating device, the pawl is then not used and is swung out of the way.

It will be seen that the damper comprises a single plate, that when closed it occupies the position represented in Fig. 5 and then decreases very slightly the size of the flue, and that when fully closed it has the position represented by dotted line in Fig. 3—that is, it extends from a line along the surface $c$, immediately below the cold-air inlet, across the flue, its side edges then coming into contact with the inner surface of the casing and a small gas-escape being left between its upper edge $c$ and the casing. It will further be seen that the valve closes with the line of the draft in the flue and then when closed said small gas-escape is above the line of the cold-air inlet, and that consequently the damper not only by the continued contact of its lower edge with the curved wall $c$, but also because upon its inner surface it is gradually inclined upward and away from the cold-air inlet, tends to deflect and carry the gases passing in the flue as far away from the inlet as possible and to deliver them to the continuation of the flue so removed. It will also be seen that the lower corner edge $c'$ of the damper when moved from its lowest or closed position is more or less outside the line of the wall of the flue below it, having entered the curved chamber formed by the curved wall $c$, and this brings the lower edge of the damper without the line of the upwardly-moving gases and serves not only to better deflect the said gases away from the inlet, but also to prevent the gases from impinging against the line of contact of the said lower edge with the curved inner surface $c$.

Having thus fully described my invention, I claim and desire to secure by Letters Patent of the United States—

1. In a furnace or other damper, a cylindrical casing provided with an air-inlet in one side thereof, in combination with a damper curved to conform to the general cylindrical shape of the casing and pivotally mounted therein to normally close said air-inlet, said casing being curved or bulged outwardly opposite the pivot of said damper to conform to the path of the lower edge of said damper as it is turned on its pivot to open said air-inlet, whereby when said damper is moved to open said air-inlet, it will partially close the direct passage through said casing and its lower edge will remain in substantial contact with the inner surface of the bulge therein and prevent the escape of smoke and gas between said lower edge and the adjacent inner surface of said casing, as and for the purposes set forth.

2. In a furnace or other damper, a cylindrical casing provided with an air-inlet in one side thereof, in combination with a damper and means located outside of said casing whereby said damper may be moved, said damper being curved to conform to the general cylindrical shape of the casing and pivotally mounted therein to normally close said air-inlet, said casing being curved or bulged outwardly opposite the pivot of said damper to conform to the path of the lower edge of said damper as it is turned on its pivot to open said air-inlet, whereby when said damper is moved to open said air-inlet, it will partially close said casing and its lower edge will remain in substantial contact with the inner surface of the bulge therein and prevent the escape of smoke and gas between said lower edge and the adjacent inner surface of said casing, as and for the purposes set forth.

FRANK A. MAGEE.

Witnesses:
F. F. RAYMOND, 2d,
J. M. DOLAN.